United States Patent
Rajaram et al.

(10) Patent No.: US 10,073,944 B2
(45) Date of Patent: Sep. 11, 2018

(54) CLOCK TREE SYNTHESIS BASED ON COMPUTING CRITICAL CLOCK LATENCY PROBABILITIES

(71) Applicant: Synopsys, Inc., Mountain View, CA (US)

(72) Inventors: Anand K. Rajaram, Austin, TX (US); Aiqun Cao, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/177,225

(22) Filed: Jun. 8, 2016

(65) Prior Publication Data
US 2017/0357746 A1      Dec. 14, 2017

(51) Int. Cl.
*G06F 17/50* (2006.01)

(52) U.S. Cl.
CPC ...... *G06F 17/5081* (2013.01); *G06F 17/5072* (2013.01); *G06F 17/505* (2013.01); *G06F 17/5045* (2013.01); *G06F 2217/62* (2013.01); *G06F 2217/84* (2013.01)

(58) Field of Classification Search
CPC .... G06F 2217/62; G06F 1/10; G06F 17/5045; G06F 2217/84; G06F 17/505; G06F 17/5031; G06F 17/50; G06F 17/5081; G06F 17/5072
See application file for complete search history.

(56) References Cited

U.S. PATENT DOCUMENTS

| | | | | |
|---|---|---|---|---|
| 6,763,513 B1 * | 7/2004 | Chang | ................ | G06F 17/505 716/114 |
| 6,782,519 B2 * | 8/2004 | Chang | ................ | G06F 1/10 716/114 |
| 6,981,233 B2 * | 12/2005 | Chang | ................ | G06F 17/5045 716/113 |
| 7,051,310 B2 * | 5/2006 | Tsao | ................ | G06F 1/10 716/114 |
| 7,117,143 B2 * | 10/2006 | Wang | ................ | G06F 17/5027 703/13 |
| 7,546,567 B2 * | 6/2009 | Cheon | ................ | G06F 17/5077 716/113 |
| 8,707,229 B1 * | 4/2014 | Dobkin | ................ | G06F 17/5031 716/106 |
| 9,135,375 B1 * | 9/2015 | Sood | ................ | G06F 17/50 |
| 2003/0135836 A1 * | 7/2003 | Chang | ................ | G06F 17/5045 716/119 |
| 2004/0225984 A1 * | 11/2004 | Tsao | ................ | G06F 1/10 716/114 |

(Continued)

*Primary Examiner* — Helen Rossoshek
(74) *Attorney, Agent, or Firm* — Park, Vaughan, Fleming & Dowler LLP; Laxman Sahasrabuddhe

(57) ABSTRACT

Systems and techniques are described for context aware clock tree synthesis (CTS). A probability value can be computed for each clock sink in the set of clock sinks, wherein each probability value represents a probability that the corresponding clock sink has a critical clock latency. Next, the set of clock sinks can be clustered into a set of clock sink clusters based on the probability values. An optimization goal for each clock sink cluster can be selected, and an optimized subtree can be constructed for each clock sink cluster based on the selected optimization goal. The synthesized clock tree can be obtained by combining the optimized subtrees.

18 Claims, 6 Drawing Sheets

(56) References Cited

U.S. PATENT DOCUMENTS

| | | | |
|---|---|---|---|
| 2007/0016884 A1* | 1/2007 | Nishimaru | G06F 17/5045 716/113 |
| 2009/0217225 A1* | 8/2009 | Sunder | G06F 1/10 716/113 |
| 2011/0260764 A1* | 10/2011 | Kitahara | G06F 17/505 327/202 |
| 2012/0240091 A1* | 9/2012 | Sunder | G06F 1/10 716/113 |
| 2014/0181766 A1* | 6/2014 | Cao | G06F 1/10 716/104 |

* cited by examiner

CLOCK TREE SYNTHESIS BASED ON COMPUTING CRITICAL CLOCK LATENCY PROBABILITIES

TECHNICAL FIELD

This disclosure relates to integrated circuits (ICs). More specifically, this disclosure relates to context aware clock tree synthesis (CTS).

BACKGROUND

Related Art

Advances in process technology and an almost insatiable appetite for consumer electronics have fueled a rapid increase in the size and complexity of IC designs. This dramatic increase in complexity and integration densities has made it considerably more challenging to design ICs.

CTS refers to the process of creating a clock tree to distribute a clock signal to a set of sequential circuit elements in an IC design. An IC design may include multiple clock domains, and each clock domain can include multiple clock trees. The quality of the clock trees that are generated by CTS can have a significant impact on timing, area, and power consumption. Hence, what are needed are systems and techniques for CTS that can efficiently create high quality clock trees.

SUMMARY

Some embodiments described herein feature systems and techniques for synthesizing a clock tree to distribute a clock signal to a set of clock sinks. The embodiments can compute a probability value for each clock sink in the set of clock sinks, wherein each probability value represents a probability that the corresponding clock sink has a critical clock latency. Next, the embodiments can cluster the set of clock sinks into a set of clock sink clusters based on the probability values (and optionally other parameters such as physical location of the clock sink in the IC design), wherein each clock sink cluster includes clock sinks whose probability values are within a non-overlapping range of probability values associated with the clock sink cluster. The embodiments can then select an optimization goal for each clock sink cluster based on the non-overlapping range of probability values associated with the clock sink cluster. Examples of optimization goals include, but are not limited to, minimizing power, minimizing area (which is sometime used as a proxy for minimizing power), and minimizing clock latency. Next, the embodiments can construct an optimized subtree for each clock sink cluster based on the optimization goal that was selected for the clock sink cluster, wherein each optimized subtree distributes the clock signal to clock sinks in the corresponding clock sink cluster. The embodiments can then combine the optimized subtrees to obtain the clock tree.

In some embodiments, computing the probability value for each clock sink in the set of clock sinks comprises: (1) constructing a temporary clock tree based on the set of clock sinks; (2) computing a clock latency for each clock sink in the set of clock sinks based on the temporary clock tree, wherein the clock latencies are computed by using an approximate timing model; and (3) computing the probability value for each clock sink in the set of clock sinks based on the computed clock latencies.

In some embodiments, clustering the set of clock sinks into the set of clock sink clusters based on the probability values comprises comparing the probability values with one or more threshold values that define two or more non-overlapping ranges of probability values.

Some embodiments can receive an activity ratio for each clock sink in the set of clock sinks, wherein each activity ratio represents a percentage of time that the corresponding clock sink is expected to be active. Next, the embodiments can place integrated clock gating (ICG) cells based on the activity ratios.

DETAILED DESCRIPTION

Figure 1:
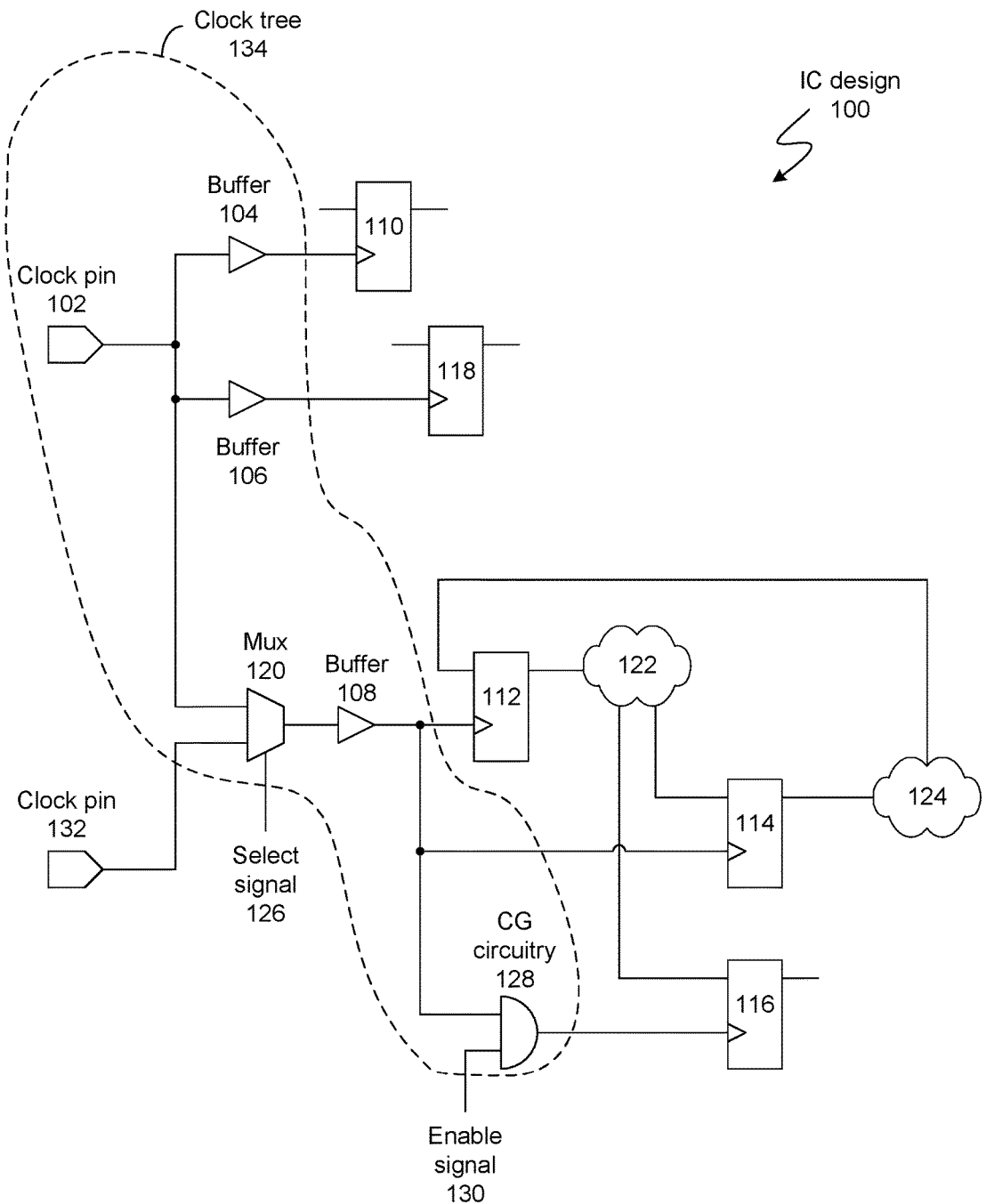
FIG. 1 illustrates a synchronous circuit in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Overview of IC Design and Manufacturing

IC design software tools can be used to create an IC design. Once the IC design is finalized, it can undergo fabrication, packaging, and assembly to produce IC chips. The overall IC design and manufacturing process can involve multiple actors, e.g., one company may create the software for designing ICs, another company may use the software to create the IC design, and yet another company may manufacture IC chips based on the IC design. An IC design flow can include multiple steps, and each step can involve using one or more IC design software tools. An improvement to any one of the steps in the IC design flow results in an improvement to the overall IC design and manufacturing process. Specifically, the improved IC design and manufacturing process can produce IC chips with a shorter time-to-market (TTL) and/or higher quality of results (QoR). Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence with the HDL code. Some embodiments described herein provide tools that can be used for synthesizing a clock tree during synthesis and design for test.

During design planning, an overall floorplan for the chip can be constructed and analyzed for timing and top-level routing. During physical implementation, circuit elements can be positioned in the layout and can be electrically coupled.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

CTS

Synchronous IC designs can be viewed as a collection of sequential circuit elements that are electrically connected via combinational logic clouds. For example, FIG. 1 illustrates a synchronous circuit in accordance with some embodiments described herein. IC design 100 includes buffers 104, 106, and 108, multiplexer 120, clock gating circuitry 128, sequential circuit elements 110, 112, 114, 116, and 118, and combinational logic clouds 122 and 124 (note that FIG. 1 only illustrates a portion of IC design 100, which may include millions of other circuit elements). A sequential circuit element can generally be any element that is timed based on a clock signal. For example, a flip-flop is a sequential circuit element. A combinational logic cloud includes one or more combinational logic gates (e.g., AND gates, OR gates, NOT gates, XOR gates, multiplexers, demultiplexers, buffers, repeaters, etc.), but does not include any sequential circuit elements.

In a synchronous circuit, data transfer between sequential circuit elements is synchronized using one or more clock signals. For example, sequential circuit element 112 can launch a signal that passes through combinational logic cloud 122 (which may logically combine the signal with other signals), and which can then be captured by sequential circuit element 114. The launch and capture are synchronized based on the respective clock signals that are provided to sequential circuit elements 112 and 114.

A clock tree comprises circuitry that distributes a clock signal to one or more sequential circuit elements in the IC design. The term "clock sink" can generally refer to any terminal in the IC design where a clock signal needs to be provided. For example, a clock input of a sequential circuit element is a clock sink. An IC design can have multiple operating modes, and depending on the operating mode of the IC design, a clock signal may be distributed to different sets of sequential circuit elements. For example, in a first mode, select signal 126 can cause multiplexer 120 to select the clock signal from clock pin 102, and enable signal 130 can be asserted (thereby causing the clock signal to pass through clock gating circuitry 128), thereby distributing the selected clock signal to sequential circuit elements 110, 112, 114, 116, and 118 (note that the clock input pins of sequential circuit elements 110, 112, 114, 116, and 118 are clock sinks). In a second mode, select signal 126 can cause multiplexer 120 to select the clock signal from clock pin 102, and enable signal 130 can be de-asserted (thereby causing the clock signal to be blocked by clock gating circuitry 128), thereby distributing the selected clock signal to sequential circuit elements 110, 112, 114, and 118, but not to sequential circuit element 116. In a third mode, select signal 126 can select the clock signal from clock pin 132, and enable signal 130 can be asserted (thereby causing the clock signal to pass through clock gating circuitry 128), thereby distributing the clock signal from clock pin 102 to sequential circuit elements 110 and 118, and distributing the clock signal from clock pin 132 to sequential circuit elements 112, 114, and 116.

An IC design can include multiple clock trees. For example, in a first mode of IC design 100, the clock signal from clock pin 102 is distributed through clock tree 134, which includes buffers 104, 106, and 108, and distributes a clock signal to sequential circuit elements 110, 112, 114, 116, and 118. However, IC design 100 also includes the clock tree that is rooted at clock pin 132 and that distributes the clock signal from clock pin 132 to sequential circuit elements 112, 114, and 116 in the third mode of IC design 100.

A clock domain can refer to a portion of an IC design that is clocked using a given clock signal. For example, in the third mode described above, sequential circuit elements 110 and 118 can be part of the clock domain that corresponds to the clock signal that is distributed from clock pin 102, and sequential circuit elements 112, 114, and 116 can be part of the clock domain that corresponds to the clock signal that is distributed from clock pin 132.

CTS is a process that constructs a clock tree by optimizing one or more clock tree metrics, e.g., global clock skew, local clock skew, latency, area, power, etc. Optimizing a clock tree can help an IC design to satisfy timing requirements. Existing clock tree optimization approaches may not produce high quality clock trees. Specifically, some existing approaches create an initial clock tree by selecting a single "best" buffer to construct the clock tree, and by optimizing a single metric (e.g., latency) across the entire clock tree. Once the initial clock tree has been constructed, these existing approaches try to optimize the initial clock tree for other metrics (e.g., area and power). However, the decisions that were made by these existing approaches when they created the initial clock tree may make it difficult (or impossible) to optimize other metrics, which can result in poor quality of results.

In contrast to existing approaches, some embodiments described herein use an explicit probabilistic approach to model uncertainty earlier in the IC design flow, and use the local context (which includes the probabilistic criticality of each clock sink) to select the best local option for a given optimization variable. The quality of the clock trees generated by embodiments described herein can be significantly better than the quality of the clock trees generated by existing approaches.

Context Aware CTS

Figure 2:
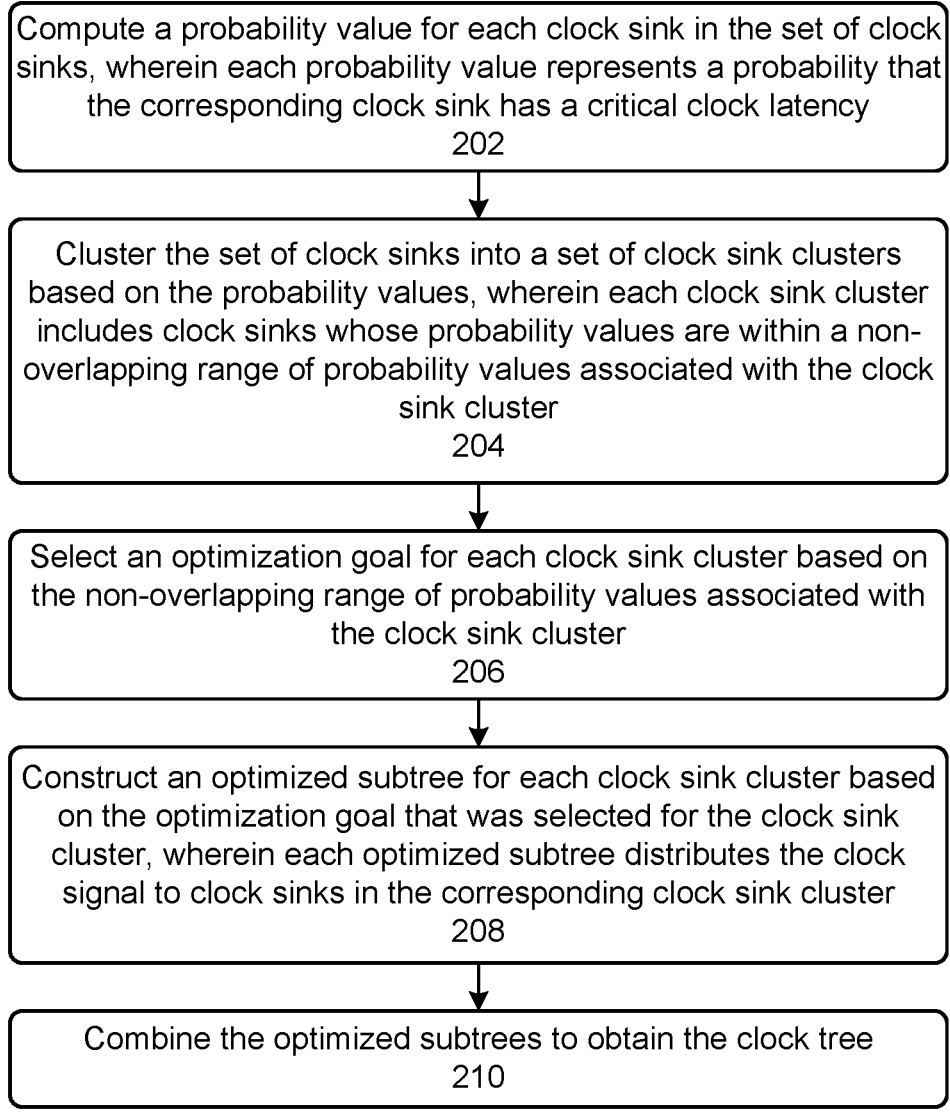
FIG. 2 illustrates a process for performing context aware CTS in accordance with some embodiments described herein.

FIG. 2 illustrates a process for performing context aware CTS in accordance with some embodiments described herein. The process can begin by computing a probability value for each clock sink in the set of clock sinks, wherein each probability value represents a probability that the corresponding clock sink has a critical clock latency (operation 202). Next, the set of clock sinks can be clustered into a set of clock sink clusters based on the probability values, wherein each clock sink cluster includes clock sinks whose probability values are within a non-overlapping range of probability values associated with the clock sink cluster (operation 204). In addition to the probability values, the clustering operation can also use other parameters (e.g., physical location in the IC design) for determining the clusters. The process can then select an optimization goal for each clock sink cluster based on the non-overlapping range of probability values associated with the clock sink cluster (operation 206). Next, the process can construct an optimized subtree for each clock sink cluster based on the optimization goal that was selected for the clock sink cluster, wherein each optimized subtree distributes the clock signal to clock sinks in the corresponding clock sink cluster (operation 208). The process can then combine the optimized subtrees to obtain the clock tree (operation 210).

Figure 3A:
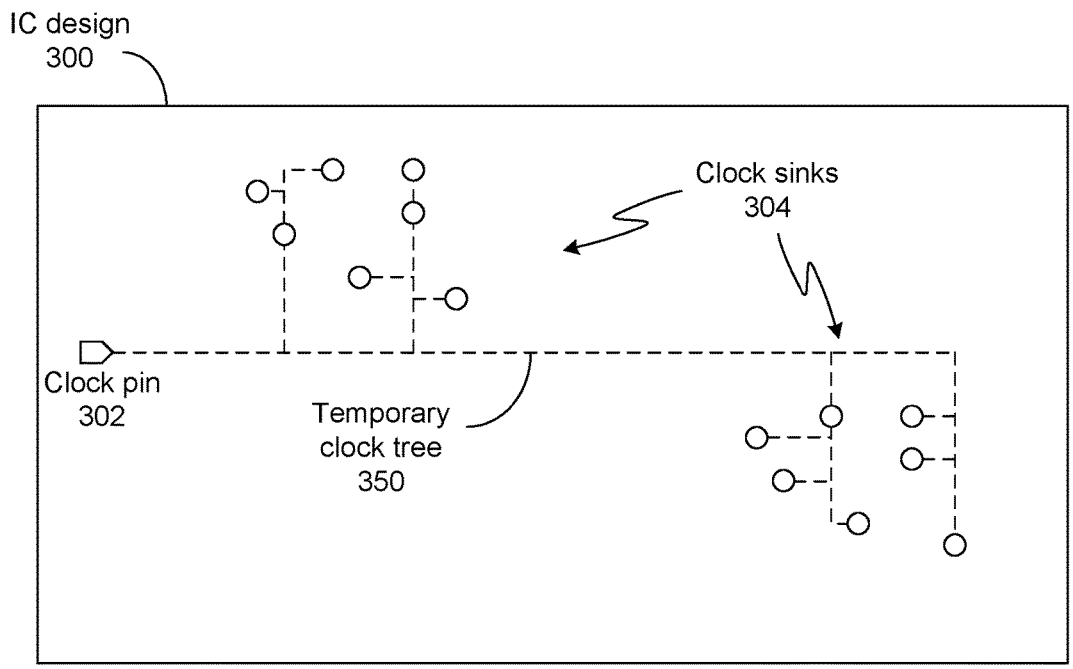
FIGS. 3A-3C illustrate an example of context aware CTS in accordance with some embodiments described herein.
Figure 3B:
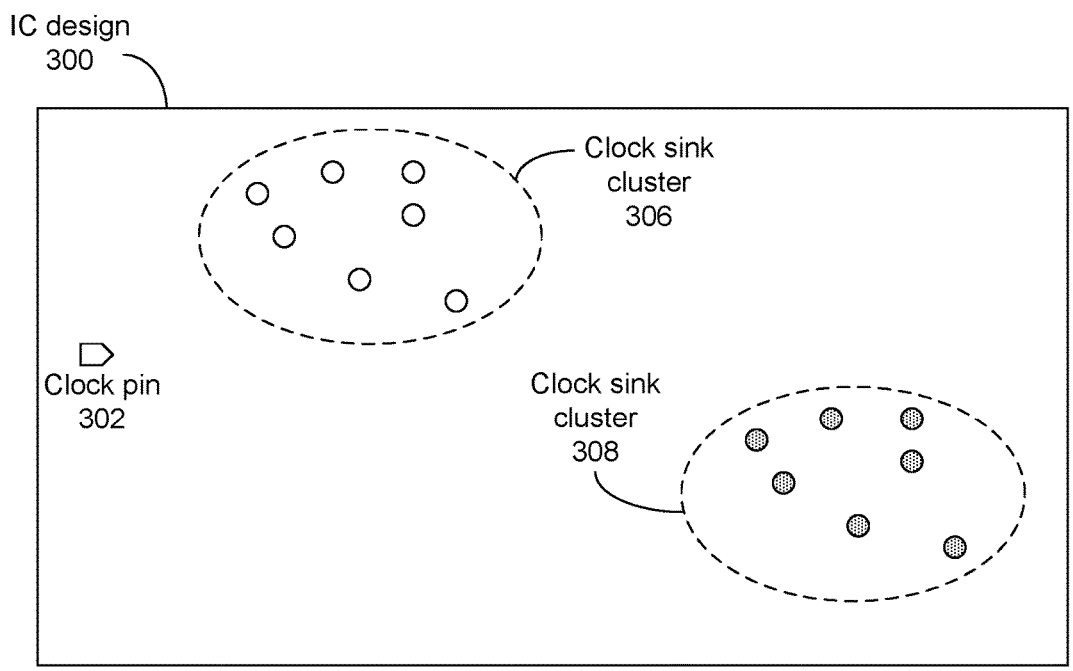
Figure 3C:
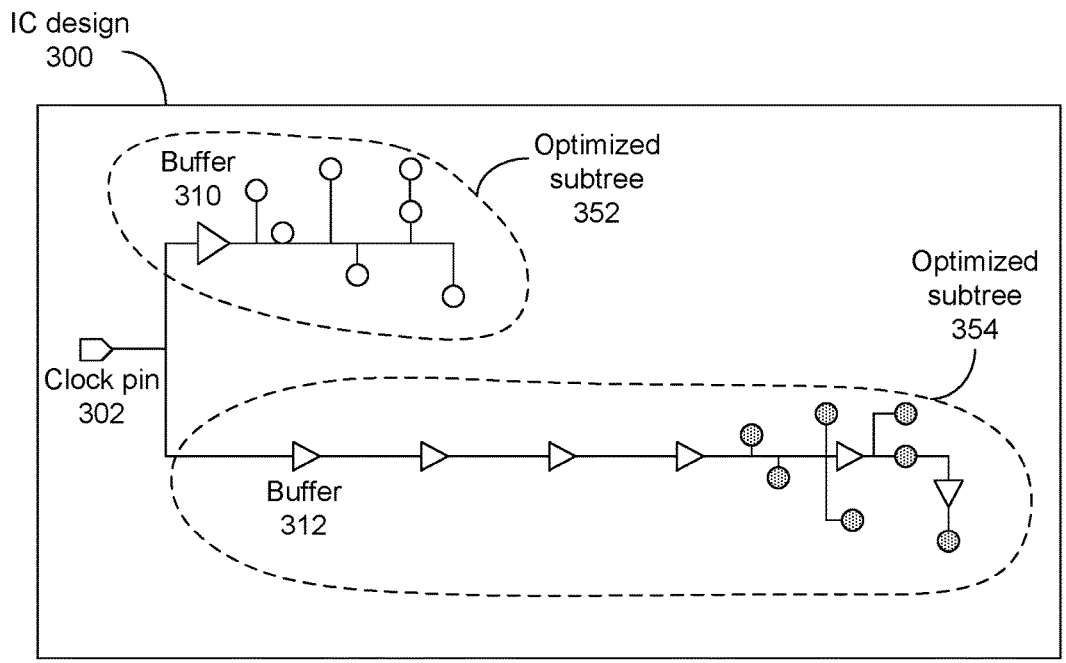

FIGS. 3A-3C illustrate an example of context aware CTS in accordance with some embodiments described herein. Note that the clock tree representations in FIGS. 3A-3C are for illustration purposes only and are not intended to represent actual clock tree topologies.

IC design 300 can include clock pin 302 and set of clock sinks 304 (the clock sinks have been shown as circles in FIG. 3A). Some embodiments can compute a probability value for each clock sink in the set of clock sinks, wherein each probability value represents a probability that the corresponding clock sink has a critical clock latency. The embodiments can generally use an approximate timing model that estimates the clock latency for a given clock sink. For example, some embodiments can construct a temporary clock tree 350 based on the set of clock sinks. Next, the embodiments can compute a clock latency for each clock sink in the set of clock sinks based on the temporary clock tree. Note that many of the design parameters of the clock tree (e.g., tree topology, buffer placement, buffer size, etc.) are not known in the early stages of the IC design flow. In some embodiments, the timing characteristics of "typical" clock trees and circuit elements can be used to create an approximate timing model, and the approximate timing model can then be used to compute clock latencies in the IC design.

The embodiments can then compute the probability value for each clock sink in the set of clock sinks based on the computed clock latencies. For example, suppose we know that a latency of L will definitely cause a design violation. Then, the probability that the clock latency of clock sink S will be critical can be given by $p_s=(x_s/\alpha L)$, $0 \leq x_s \leq \alpha L$, where $p_s$ is the probability value, $x_s$ is the estimated clock latency for clock sink S (i.e., the clock latency computed using the approximate timing model), and $\alpha$ is a fraction between 0 and 1 that represents the uncertainty in the approximate timing model. For example, $\alpha$ can be 0.8 which means that a clock latency that is only 80% of L will treated as a clearly violating clock latency. Note that if $x_s$ is greater than $\alpha L$, then the probability is 1, i.e., $p_s$ is never greater than 1. Once the probability values have been calculated, the temporary clock tree (if one was created for determining the probability values) can be deleted (note that the temporary clock tree may be very different from the actual clock tree that is eventually synthesized).

Once the clock sinks have been assigned probability values, they can then be clustered based on the probability values and optionally other parameters (e.g., physical location of the clock sinks in the IC design), wherein each clock sink cluster includes clock sinks whose probability values are within a non-overlapping range of probability values associated with the clock sink cluster. Specifically, the embodiments can cluster the set of clock sinks by comparing the probability values with one or more probability thresholds that define two or more non-overlapping ranges of probability values. For example, as shown in FIG. 3B, a single probability threshold can be used to cluster the clock sinks into two clusters—clock sink cluster 306 that includes clock sinks whose probability values are less than the probability threshold, and clock sink cluster 308 that includes clock sinks whose probability values are greater than or equal to the probability threshold. If more than one probability threshold is used, then that would define more than two non-overlapping probability ranges, which can then be used to create more than two clusters.

The embodiments can then select an optimization goal for each clock sink cluster based on the non-overlapping range of probability values associated with the clock sink cluster. In general, there is an inverse relationship between area (or power) and clock latency, i.e., decreasing the area (or power) typically increases the clock latency, and vice versa. Therefore, simultaneously minimizing both area (or power) and clock latency can often be impossible. However, because embodiments described herein use criticality probabilities to cluster clock sinks, these embodiments can intelligently optimize different clusters based on different optimization goals. For example, the embodiments can select the optimization goal of minimizing area (or power) for clock sink cluster 306 because these clock sinks are unlikely to be latency critical, and select the optimization goal of minimizing clock latency for clock sink cluster 308 because these clock sinks are likely to be latency critical.

Next, the embodiments can construct an optimized subtree for each clock sink cluster based on the optimization goal that was selected for the clock sink cluster, wherein each optimized subtree distributes the clock signal to clock sinks in the corresponding clock sink cluster. For example, the embodiments can construct optimized subtree 352 (which corresponds to clock sink cluster 306) that is optimized for area (or power), and optimized subtree 354 that is optimized for clock latency (which corresponds to clock sink cluster 308). Specifically, optimized subtree 352 can use (1) buffers with the minimum area (or power) per unit drive strength (e.g., buffer 310), and/or (2) wires that are narrower than the default wire width (narrower wires can conserve area, but can result in a greater clock latency). Specifically, the embodiments can create non-default routing rules that cause the router to use narrower wires when routing optimized subtree 352. On the other hand, optimized subtree 354 can use (1) buffers with the minimum delay per unit wire length (e.g., buffer 312), and/or (2) wires that are broader than the default wire width (broader wires can increase routing area, but can result in a lower clock latency). Specifically, the embodiments can create non-default routing rules that cause the router to use broader wires when routing optimized subtree 354. The optimized subtrees can be combined to obtain the clock tree.

Figure 4A:
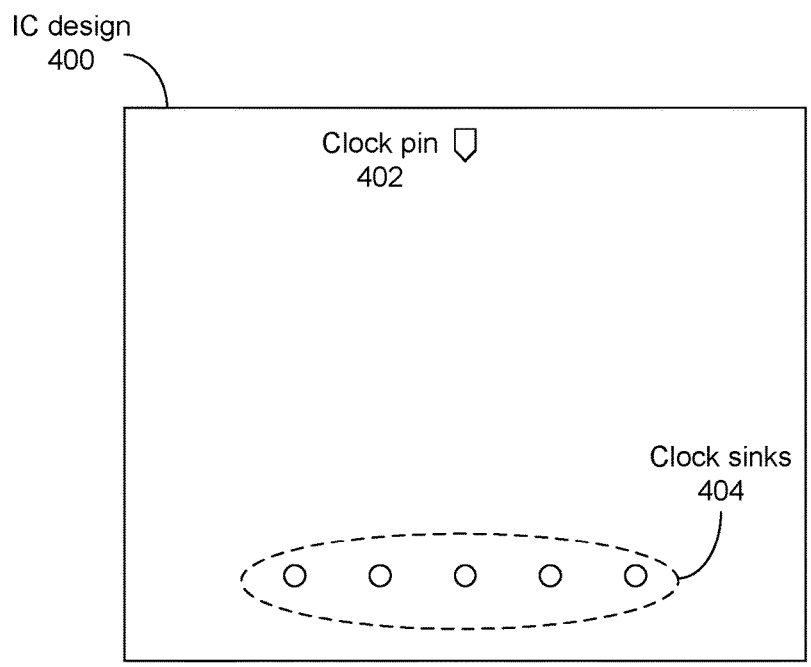
FIGS. 4A-4C illustrate another example of context aware CTS in accordance with some embodiments described herein.
Figure 4B:
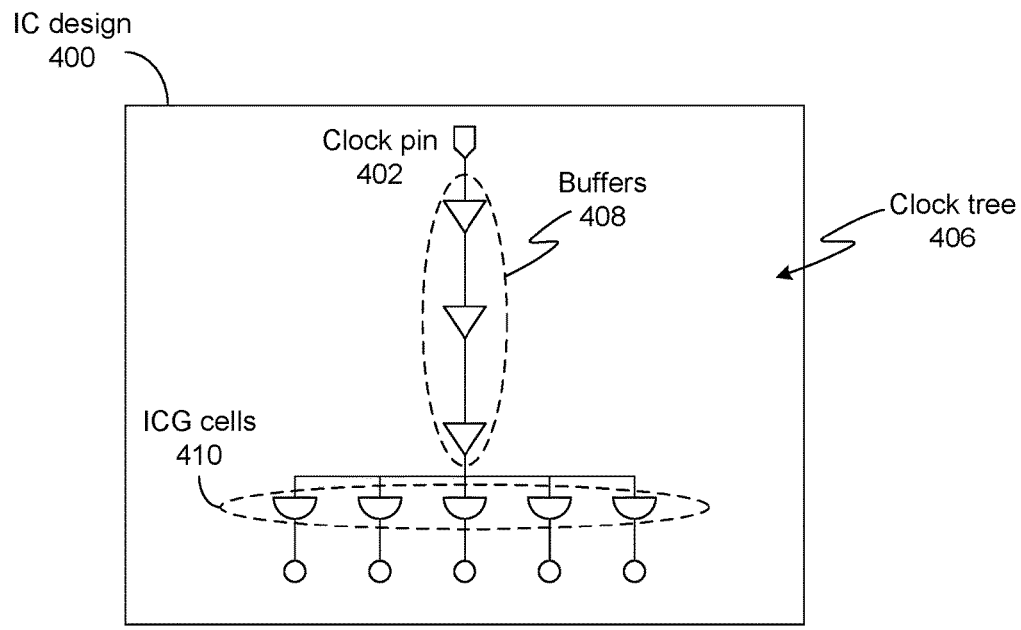
Figure 4C:
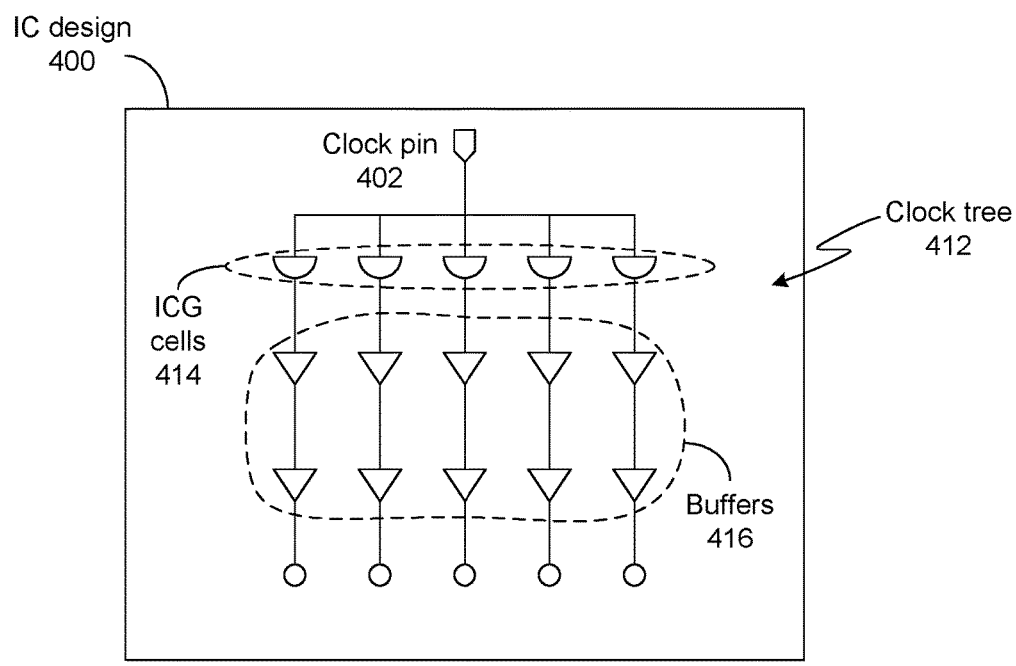

Context aware CTS can also intelligently place integrated clock gating (ICG) cells. ICG cells can be used to substantially reduce power consumption of an IC design by blocking clock signals of portions of the IC design that are in an "off" state. Specifically, some embodiments can receive an activity ratio for each clock sink in the set of clock sinks, wherein each activity ratio represents a percentage of time that the corresponding clock sink is expected to be active. Next, the embodiments can place ICG cells based on the activity ratios. FIGS. 4A-4C illustrate another example of context aware CTS in accordance with some embodiments described herein. Note that the clock tree representations in FIGS. 4A-4C are for illustration purposes only and are not intended to represent actual clock tree topologies.

IC design 400 can include clock pin 402 and clock sinks 404. Each clock sink can be associated with an activity ratio that represents a percentage of time that the corresponding clock sink is expected to be active (an enable signal of an ICG cell can be used to allow a clock signal to pass through and reach the clock sink when the clock sink is active; on the other hand, the enable signal of the ICG cell can be used to block the clock signal when the clock sink is not active). The activity ratio can be provided by a user, or can be automatically determined via simulation and/or analysis of the HDL design. The activity ratio can then be used to select an ICG placement that results in the lowest power consumption. For example, FIGS. 4B and 4C illustrate two different clock trees: clock tree 406 that includes buffers 408 and ICG cells 410, and clock tree 412 that includes buffers 416 and ICG cells 414. Clock tree 406 has a lower area than clock tree 412 because clock tree 406 has fewer buffers. However, if the clock signal is expected to be blocked by the clock gating cells for most of the time, then clock tree 412 can have a lower power consumption than clock tree 406. Stated differently, the power consumption of clock tree 412 can be lower than clock tree 406 if the activity ratio is less than a threshold value.

Specifically, some embodiments can place ICG cells as follows. If the activity ratio is greater than or equal to an activity threshold, then the embodiments can place the ICG cells as close to the clock sinks as possible (e.g., this ICG cell placement strategy may be provided to a placement engine, thereby resulting in clock tree 406). On the other hand, if the activity ratio is less than the activity threshold, then the embodiments can place the ICG cells as close to the clock tree root as possible (e.g., this ICG cell placement strategy may be provided to the placement engine, thereby resulting in clock tree 412). Note that a given placement strategy can be considered to be an "optimization goal." In other words, some embodiments described herein can select an optimization goal based on the activity ratios associated with a set of clock sinks, and then place ICG cells in the clock tree in accordance with the selected optimization goal.

Figure 5:
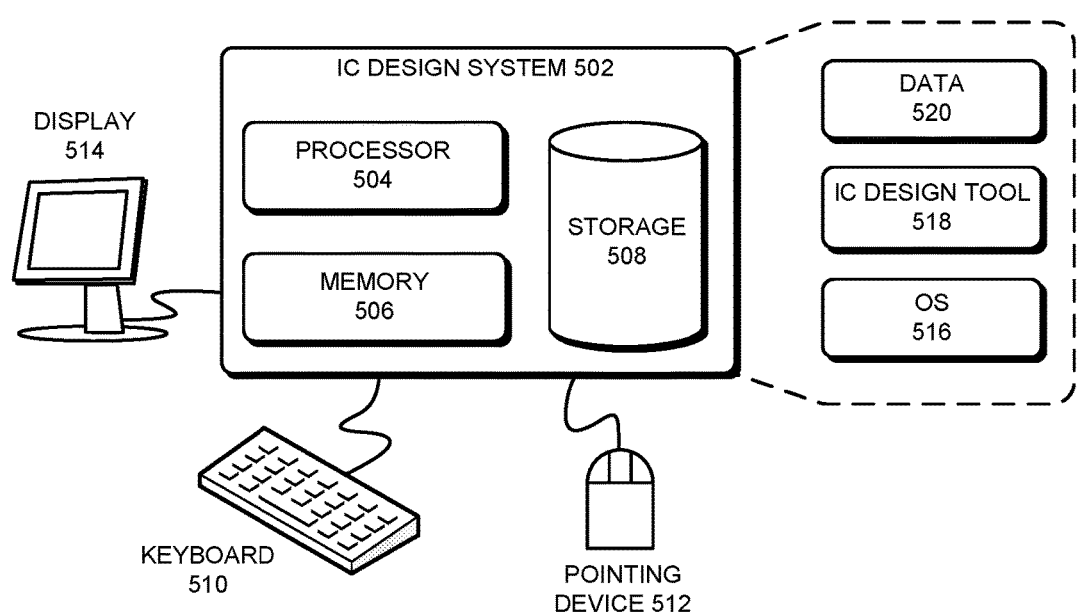
FIG. 5 illustrates an IC design system in accordance with some embodiments described herein.

The term "IC design system" generally refers to a hardware based system that is used in an overall IC design and manufacturing process. Specifically, an IC design system facilitates the design of ICs, so that the ICs can be subsequently manufactured at a semiconductor fabrication facility. FIG. 5 illustrates an IC design system in accordance with some embodiments described herein. IC design system 502 can include processor 504, memory 506, and storage device 508. Specifically, memory locations in memory 506 can be addressable by processor 504, thereby enabling processor 504 to access (e.g., via load/store instructions) and manipulate (e.g., via logical/floating point/arithmetic instructions) the data stored in memory 506. IC design system 502 can be coupled to display device 514, keyboard 510, and pointing device 512. Storage device 508 can store operating system 516, IC design tool 518, and data 520. Data 520 can include input required by IC design tool 518 and/or output generated by IC design tool 518.

IC design system 502 may automatically (or with user help) perform one or more operations that are implicitly or explicitly described in this disclosure. Specifically, IC design system 502 can load IC design tool 518 into memory 506, and IC design tool 518 can then be used to perform context aware CTS. Next, IC design tool 518 (or another tool that is stored in storage 508) can determine whether or not an IC chip manufactured based on the IC design (which includes the clock tree that was synthesized using context aware CTS) will perform as desired. If the IC chip is expected to perform as desired, the overall IC design and manufacturing process can proceed to the next step. Otherwise, the overall IC design and manufacturing process can return to a previous step in which the IC design can be modified.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for synthesizing a clock tree to distribute a clock signal to a set of clock sinks in a circuit design, the method comprising:

computing a probability value for each clock sink in the set of clock sinks in the circuit design, wherein each probability value represents a probability that the corresponding clock sink has a critical clock latency;

clustering the set of clock sinks into a set of clock sink clusters based on the probability values, wherein each clock sink cluster includes clock sinks whose probability values are within a specific range of probability values associated with the clock sink cluster;

selecting an optimization goal for each clock sink cluster based on the specific range of probability values associated with the clock sink cluster;

constructing an optimized subtree for each clock sink cluster based on the optimization goal that was selected for the clock sink cluster, wherein each optimized subtree distributes the clock signal to clock sinks in the corresponding clock sink cluster;

combining the optimized subtrees to obtain the clock tree for the circuit design; and providing the circuit design to a next step in a circuit design and manufacturing process which, when completed, produces a better quality integrated circuit chip that contains the clock tree.

2. The non-transitory computer-readable storage medium of claim 1, wherein computing the probability value for each clock sink in the set of clock sinks comprises:

constructing a temporary clock tree based on the set of clock sinks;

computing a clock latency for each clock sink in the set of clock sinks based on the temporary clock tree, wherein the clock latencies are computed by using an approximate timing model; and computing the probability value for each clock sink in the set of clock sinks based on the computed clock latencies.

3. The non-transitory computer-readable storage medium of claim 1, wherein clustering the set of clock sinks into the set of clock sink clusters based on the probability values comprises comparing the probability values with one or more threshold values that define two or more specific ranges of probability values.

4. The non-transitory computer-readable storage medium of claim 1, wherein the optimization goal is to minimize area.

5. The non-transitory computer-readable storage medium of claim 1, wherein the optimization goal is to minimize clock latency.

6. The non-transitory computer-readable storage medium of claim 1, wherein the method further comprises:

receiving an activity ratio for each clock sink in the set of clock sinks, wherein each activity ratio represents a percentage of time that the corresponding clock sink is expected to be active; and placing integrated clock gating (ICG) cells in the clock tree based on the activity ratios.

7. An integrated circuit (IC) design system, comprising:
a processor; and
a non-transitory computer-readable storage medium storing instructions that, when executed by the processor, cause the IC design system to perform a method for synthesizing a clock tree to distribute a clock signal to a set of clock sinks in a circuit design, the method comprising:

computing a probability value for each clock sink in the set of clock sinks in the circuit design, wherein each probability value represents a probability that the corresponding clock sink has a critical clock latency;

clustering the set of clock sinks into a set of clock sink clusters based on the probability values, wherein each clock sink cluster includes clock sinks whose probability values are within a specific range of probability values associated with the clock sink cluster;

selecting an optimization goal for each clock sink cluster based on the specific range of probability values associated with the clock sink cluster;

constructing an optimized subtree for each clock sink cluster based on the optimization goal that was selected for the clock sink cluster, wherein each optimized subtree distributes the clock signal to clock sinks in the corresponding clock sink cluster;

combining the optimized subtrees to obtain the clock tree for the circuit design; and providing the circuit design to a next step in a circuit design and manufacturing process which, when completed, produces a better quality integrated circuit chip that contains the clock tree.

8. The IC design system of claim 7, wherein computing the probability value for each clock sink in the set of clock sinks comprises:

constructing a temporary clock tree based on the set of clock sinks;

computing a clock latency for each clock sink in the set of clock sinks based on the temporary clock tree, wherein the clock latencies are computed by using an approximate timing model; and computing the probability value for each clock sink in the set of clock sinks based on the computed clock latencies.

9. The IC design system of claim 7, wherein clustering the set of clock sinks into the set of clock sink clusters based on the probability values comprises comparing the probability values with one or more threshold values that define two or more specific ranges of probability values.

10. The IC design system of claim 7, wherein the optimization goal is to minimize area.

11. The IC design system of claim 7, wherein the optimization goal is to minimize clock latency.

12. The IC design system of claim 7, wherein the method further comprises:

receiving an activity ratio for each clock sink in the set of clock sinks, wherein each activity ratio represents a percentage of time that the corresponding clock sink is expected to be active; and placing integrated clock gating (ICG) cells in the clock tree based on the activity ratios.

13. A method for synthesizing a clock tree to distribute a clock signal to a set of clock sinks in a circuit design, the method comprising:

computing, by using a computer, a probability value for each clock sink in the set of clock sinks in the circuit design, wherein each probability value represents a probability that the corresponding clock sink has a critical clock latency;

clustering the set of clock sinks into a set of clock sink clusters based on the probability values, wherein each clock sink cluster includes clock sinks whose probability values are within a specific range of probability values associated with the clock sink cluster;

selecting an optimization goal for each clock sink cluster based on the specific range of probability values associated with the clock sink cluster;

constructing an optimized subtree for each clock sink cluster based on the optimization goal that was selected for the clock sink cluster, wherein each optimized subtree distributes the clock signal to clock sinks in the corresponding clock sink cluster;

combining the optimized subtrees to obtain the clock tree for the circuit design; and providing the circuit design to a next step in a circuit design and manufacturing process which, when completed, produces a better quality integrated circuit chip that contains the clock tree.

14. The method of claim 13, wherein computing the probability value for each clock sink in the set of clock sinks comprises:

constructing a temporary clock tree based on the set of clock sinks;

computing a clock latency for each clock sink in the set of clock sinks based on the temporary clock tree, wherein the clock latencies are computed by using an approximate timing model; and computing the probability value for each clock sink in the set of clock sinks based on the computed clock latencies.

15. The method of claim 13, wherein clustering the set of clock sinks into the set of clock sink clusters based on the probability values comprises comparing the probability values with one or more threshold values that define two or more specific ranges of probability values.

16. The method of claim 13, wherein the optimization goal is to minimize area.

17. The method of claim 13, wherein the optimization goal is to minimize clock latency.

18. The method of claim 13, wherein the method further comprises:

receiving an activity ratio for each clock sink in the set of clock sinks, wherein each activity ratio represents a percentage of time that the corresponding clock sink is expected to be active; and placing integrated clock gating (ICG) cells in the clock tree based on the activity ratios.

* * * * *